(12) United States Patent
Cunningham et al.

(10) Patent No.: US 7,267,354 B2
(45) Date of Patent: Sep. 11, 2007

(54) TOWING DEVICE

(76) Inventors: John P. Cunningham, 125 Willard Cir., Hurricane, WV (US) 25526; Robert Cunningham, P.O. Box 903, Institute, WV (US) 25112

(*) Notice: Subject to any disclaimer, the term of this patent is extended or adjusted under 35 U.S.C. 154(b) by 110 days.

(21) Appl. No.: 11/176,262

(22) Filed: Jul. 8, 2005

(65) Prior Publication Data

US 2006/0006625 A1    Jan. 12, 2006

Related U.S. Application Data

(60) Provisional application No. 60/585,880, filed on Jul. 8, 2004.

(51) Int. Cl.
*B60D 1/52* (2006.01)
(52) U.S. Cl. ............... 280/480; 280/402; 280/493; 280/495
(58) Field of Classification Search ............... 280/480, 280/402, 493, 494
See application file for complete search history.

(56) References Cited

U.S. PATENT DOCUMENTS

| | | | | |
|---|---|---|---|---|
| 3,000,652 A | * | 9/1961 | Hawkins | 280/406.1 |
| 3,101,854 A | * | 8/1963 | Kampert | 414/685 |
| 3,806,162 A | * | 4/1974 | Milner | 280/502 |
| 4,037,681 A | * | 7/1977 | Gorby | 180/235 |
| 4,087,008 A | * | 5/1978 | Silva, Jr. | 414/563 |
| 4,266,800 A | * | 5/1981 | Hawkins | 280/491.4 |
| 4,640,523 A | * | 2/1987 | Wolmarans | 280/491.4 |
| 4,861,061 A | * | 8/1989 | Frantz | 280/479.2 |
| 5,350,184 A | * | 9/1994 | Hull et al. | 280/204 |
| 5,570,897 A | * | 11/1996 | Wass | 280/495 |
| 6,474,676 B1 | * | 11/2002 | Palaia | 280/502 |
| 6,942,443 B2 | * | 9/2005 | Shubert | 414/563 |

* cited by examiner

*Primary Examiner*—Kevin Hurley
(74) *Attorney, Agent, or Firm*—Akerman Senterfitt; Jean C. Edwards, Esq.

(57) ABSTRACT

The present invention relates to a towing device which can be attached to a vehicle, in order to tow a heavy equipment vehicle, such as a tractor. The towing device includes a towbar hitch having two ends, a first end which attaches to a towing vehicle and a second end attached to a vehicle to be towed; a holder disposed at the second end of the towbar hitch, which holds the vehicle to be towed; and an attachment mechanism which attaches the vehicle to be towed, to the holder. The attachment mechanism includes a plurality of connectors or turnbuckles; and a plurality of links or chains which are attached to the holder, and to the vehicle to be towed. The connectors and the links can be adjusted in length.

22 Claims, 6 Drawing Sheets

TOWING DEVICE

CROSS-REFERENCE TO RELATED APPLICATIONS

The present invention claims priority from U.S. Provisional Patent Application No. 60/585,880, filed Jul. 8, 2004, the contents of which are herein incorporated by reference in its entirety.

BACKGROUND OF THE INVENTION

1. Field of the Invention

The present invention relates to a towing device or hitch assembly which can be used to tow a vehicle, such as a heavy equipment vehicle.

2. Description of the Related Art

Conventionally, trailers or flatbed trucks have been used to tow heavy equipment vehicles from one site to another. In particular, flatbed trucks have been used to tow heavy equipment vehicles of unique size or configuration. However, it is expensive to utilize flatbed trucks, and to purchase and maintain trailers for this purpose. In addition, the size of the trailers or trucks needed, particularly in city environments, has made mobility and access to various sites extremely difficult.

Heavy equipment such as tractors, have conventionally been towed by trailer or flatbed truck for these reasons. However, an apparatus and method of towing a vehicle, particularly a heavy equipment vehicle such as a tractor, which would not require a flatbed truck, or a trailer, or expensive or complicated attachments therefor, and which would be able to tow the vehicle safely and without time-consuming effort, would be advantageous.

SUMMARY OF THE INVENTION

The present invention relates to a towing device which can be attached to a vehicle, in order to tow a heavy equipment vehicle, such as a tractor.

In one embodiment consistent with the present invention, a towing device for a vehicle includes a towbar hitch having two ends, a first end which attaches to a towing vehicle and a second end attached to a vehicle to be towed; a holder disposed at the second end of the towbar hitch, which holds the vehicle to be towed; and an attachment mechanism which attaches the vehicle to be towed, to the holder.

In one embodiment consistent with the present invention, the attachment mechanism includes a plurality of connectors; and a plurality of links; wherein the connectors and the links are attached to the holder, and to the vehicle to be towed. The connectors and the links can be adjusted in length.

In one embodiment consistent with the present invention, the connectors are turnbuckles, and the links are chains, and the turnbuckles and the chains are attached to the vehicle being towed using pins at a plurality of brackets. The attachment mechanism further includes a coiled spring for additional security.

In one embodiment consistent with the present invention, the vehicle to be towed is a tractor. Further, the attachment mechanism of the towing device to the tractor includes a plurality of turnbuckles; and a plurality of chains; wherein the turnbuckles and the chains are attached to the holder, and to the tractor, via a plurality of pins at a plurality of brackets. Further, the tractor includes a bucket, and the holder includes a recess in which an edge of the bucket is inserted. A plurality of chains and a plurality of turnbuckles secure the bucket and the holder to the tractor. The turnbuckles and the chains can be adjusted in length, and the attachment mechanism further includes a coiled spring for additional security.

In one embodiment consistent with the present invention, the holder is lined with rubber or a synthetic material. In addition, the chains may be covered in rubber or a synthetic material.

In one embodiment consistent with the present invention, the towbar hitch is attached to the holder by a plurality of bars, and by a single bar having a peg, to the towing vehicle.

Finally, in one embodiment consistent with the present invention, a locking mechanism is provided for the rear wheels of the tractor, to allow the wheels to move freely during towing.

There has thus been outlined, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

DESCRIPTION OF THE INVENTION

The present invention relates to a towing device 100 or hitch assembly which can attach a vehicle to be towed, to a towing vehicle, such that the former can be towed easily. In particular, the present invention can be used to tow a heavy equipment vehicle, such as a tractor, without the use of a trailer or flatbed truck, but rather simply by using another vehicle, such as a pickup truck.

Figure 1:
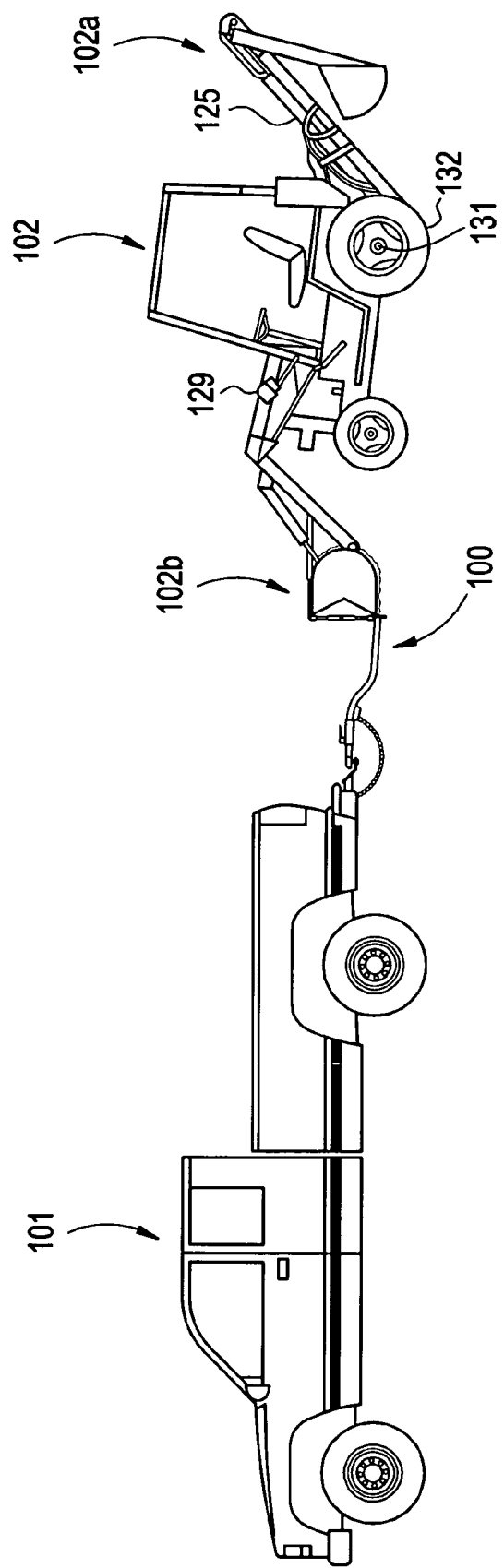
FIG. 1 shows a side view of the towing device consistent with the present invention, secured to a vehicle towing a heavy equipment vehicle.

In one embodiment consistent with the present invention, the towing device 100 or hitch assembly is shown in FIG. 1, in side view, attached to a pickup truck 101, and towing a heavy equipment vehicle. The exemplary embodiment of the vehicle 102 to be towed is a conventional tractor, which includes a backhoe 102a and loader 102b, similar to Model T7 or T9 manufactured by the Terramite Corporation.

Figure 2:
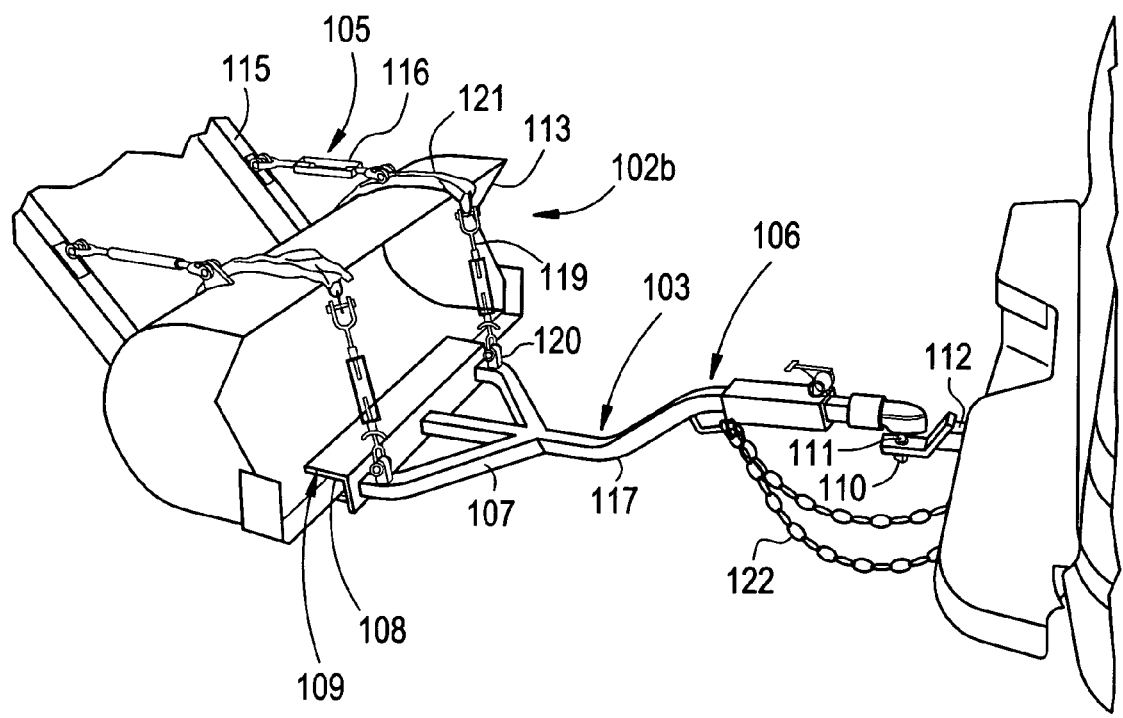
FIG. 2 is a perspective view of the towing device consistent with the present invention, and shows the towing device secured to a heavy equipment vehicle and to the towing vehicle.

The towing device 100 or hitch assembly, in one embodiment consistent with the present invention, generally includes a towbar hitch 103, and turnbuckle and chain assembly or attachment mechanism or means 105, as shown in FIG. 2.

The towbar hitch 103 is made of a strong, durable material, such as steel, and is shaped to have a single bar 106 at one end, and branches into multiple bars 107 supporting a clamp or holder 108 at the other end. There is a bend in the towbar hitch 103, which slants downwardly toward the holder 108 end of the towbar hitch 103. However, the configuration of the bars 106, 107, and the towbar hitch 103 itself, can be in any shape or size as long as they support the holder 108 at the one end, and are capable of being attached to the towing vehicle 101 at the other end.

In one embodiment consistent with the present invention, the towbar hitch 103 has an attachment 110 at the single bar 106 end of the hitch 103, in order to connect to the towing vehicle 101. The attachment can be a rod 110 or pipe, which extends downwardly from the bar 106, for insertion into the hole 111 of a trailer hitch 112, to attach the towing device 100 to the towing vehicle 101. In addition, there is a safety mechanism 122, such as safety links or chains 122, which are detacably attached to the towbar hitch 103, and which can be secured to the vehicle 101. The safety links or chains 122 can be made of steel or any other type of durable, strong material, such as a synthetic or roped/corded material.

It is noted that the trailer hitch 112 of the vehicle 101 may be a conventional hitch assembly with conventional attachment mechanisms, such that no special equipment is needed to attach the towbar hitch 103 or safety links or chains 122 of the towing device 100 of the present invention, to the vehicle 101. This is advantageous in that there is no special equipment needed to tow the heavy vehicle equipment, such as the tractor 102, and only a pickup truck 101 or other passenger vehicle can be used.

The holder 108 at the other end of the towbar hitch 103, is configured to attach to any vehicle of any shape or size, which is being towed. For example, the holder 108 can be shaped for attachment to a bumper of a vehicle, rather than to heavy vehicle equipment.

In one embodiment of the present invention, the holder 108 is designed to be attached to a tractor 102. Accordingly, the holder 108 is configured to be roughly rectangular in shape, with a recess 109 therein (i.e., roughly rectangular or U-shaped), which allows the lower edge of the tractor bucket 113 to be inserted into the recess 109, as part of the attachment mechanism 105 to the towbar hitch 103 of the towing device 100. The holder 108 may be lined on the inside with a protective material, such as rubber or plastic 133, such that the holder 108 protects the surface of the vehicle or object being towed.

In one embodiment consistent with the present invention, the tractor bucket 113, which is supported by tractor arms 115, is held in place by two connectors, such as struts or adjustable turnbuckles 116 (see FIGS. 2 and 3), which are attached to the tractor arms 115. In one embodiment, the attachment of the turnbuckles 116 is via pins inserted through the ends of the turnbuckles 116 at the brackets 118. However, it is understood that the turnbuckles 116 may be secured at the brackets 118 via any other mechanism that allows its movement (i.e., hinges etc.). The brackets 118 themselves may be steel or synthetic, and may be detachable. The turnbuckles 116—which may be adjustable in length—keep the bucket 113 in a fixed position such that the bucket 113 does not drag on the ground when the tractor 102 is being towed.

Specifically, the turnbuckles 116, in cooperation with the towbar hitch 103—which bends at bend 117, sufficiently downwardly such that the holder 108 keeps the bucket 113 a sufficient height from the ground—prevent the tractor 102 from dragging on the ground when the tractor 102 is being towed. When the tractor 102 is in normal use, the turnbuckles 116 can be released from the bucket 116, and moved into a closed position against the arms 115 of the tractor 103, and locked into position by attachment at brackets 118 using pins or other connection means (see FIG. 3).

Figure 3:
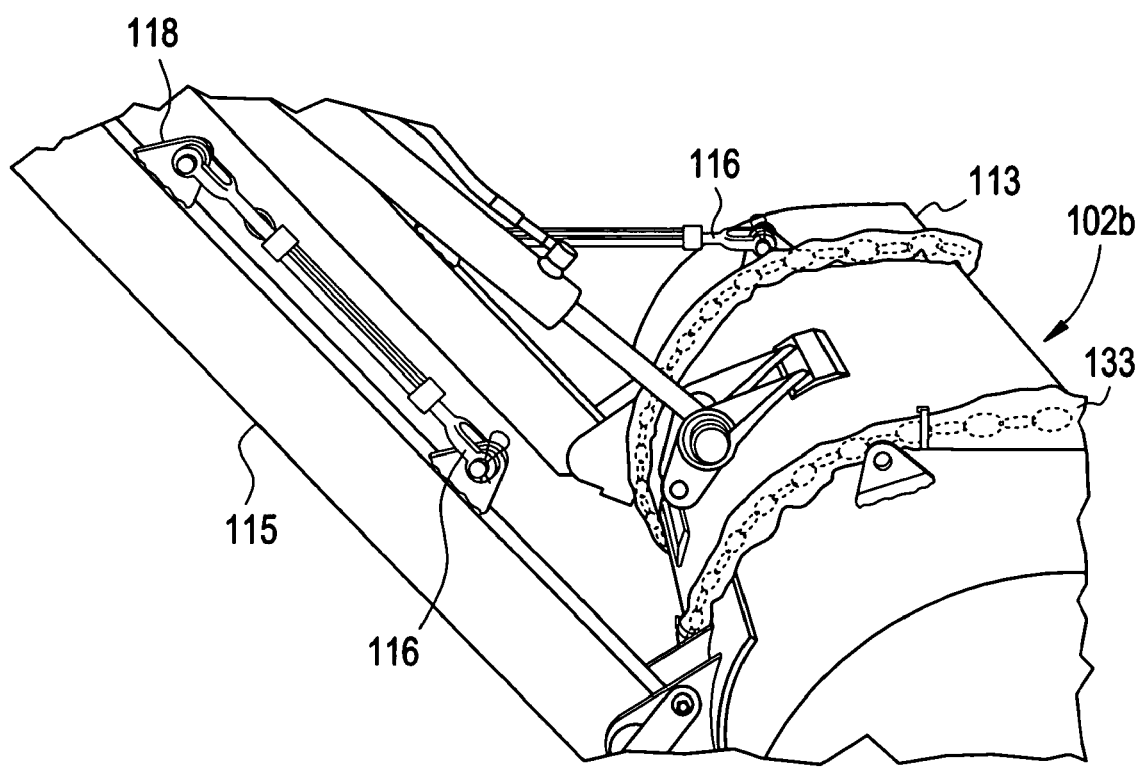
FIG. 3 is a side view of the towed device, showing more detail of the turnbuckle assembly of the towing device, consistent with the present invention.

In addition, in one embodiment consistent with the present invention, turnbuckles 119, which likewise may be adjustable in length, may be pinned or connected at brackets 120 or the like on the holder 108 of the towbar hitch 103, in order to keep the bucket 113 from tipping (see FIG. 3). Links or chains 121 are attached to the turnbuckles 119, and wrap around the bucket 113 to brackets (not shown) on the underside of the holder 108, to hold the bucket 113 in place. The links or chains 121 can be adjusted depending on the length required to secure the part of the vehicle 102 being towed.

The links or chains 121 disposed around the bucket 113 can be covered with a rubber 133 or plastic material to protect the bucket 113 from damage from friction with the links or chains 121 (see FIG. 3). In addition, as stated above, another material may be used instead of steel chains 121, such as a synthetic or a roped/corded material.

Figure 4:
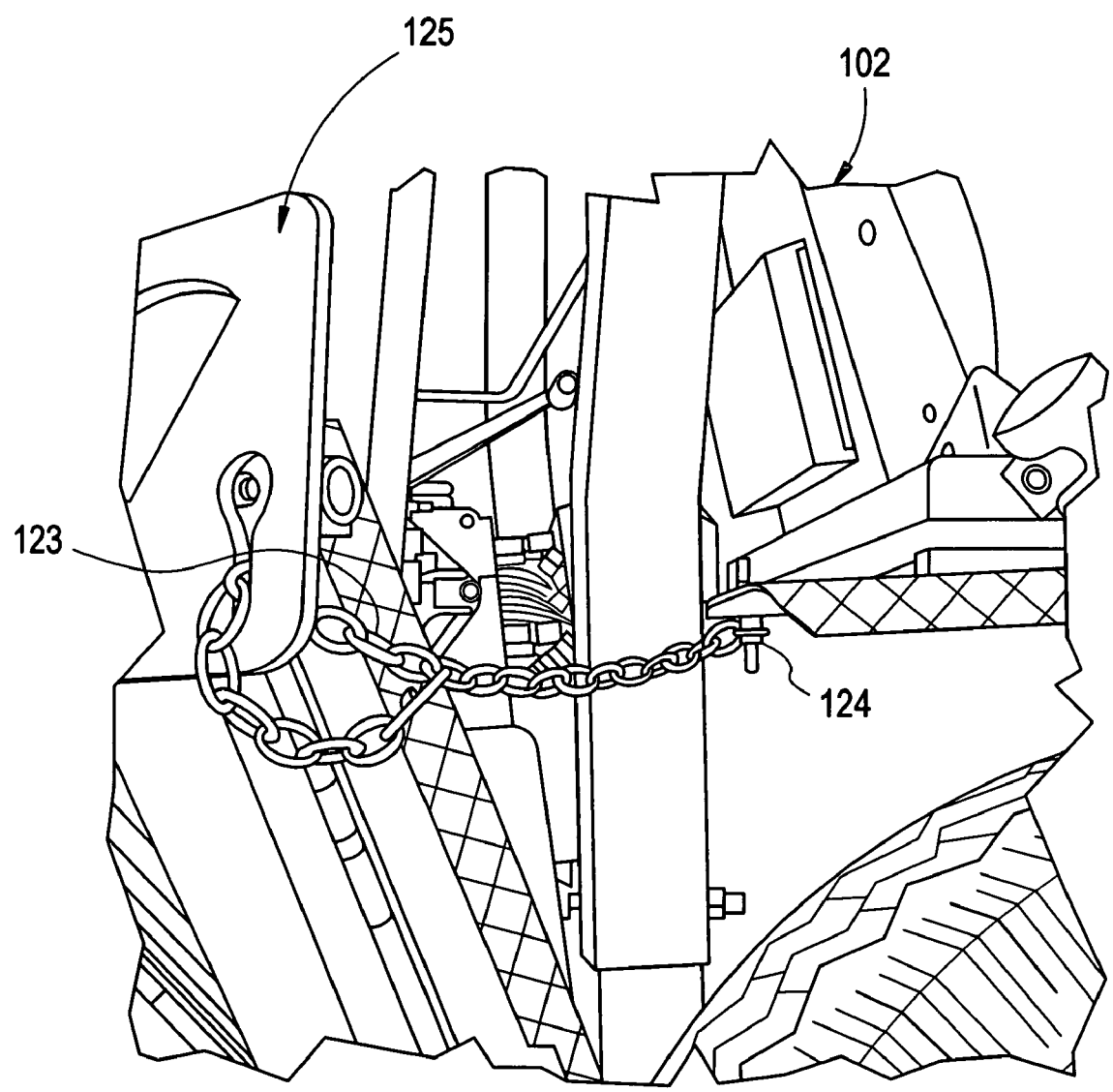
FIG. 4 is a side view of the towed vehicle, showing a chain assembly of the towing device consistent with the present invention, as attached to the towed vehicle.

In addition to the links or chains 121 disposed around the bucket 113, in one embodiment consistent with the present invention, similar links or chains 123 or the like can be attached to the frame of the tractor 102 using similar brackets 124 or the like, in order to secure the backhoe 102a (see FIG. 4). The links or chains 123 are adjustable in order to keep the boom 125 (see FIG. 1) of the backhoe 102a from dragging on the ground.

Figure 5:
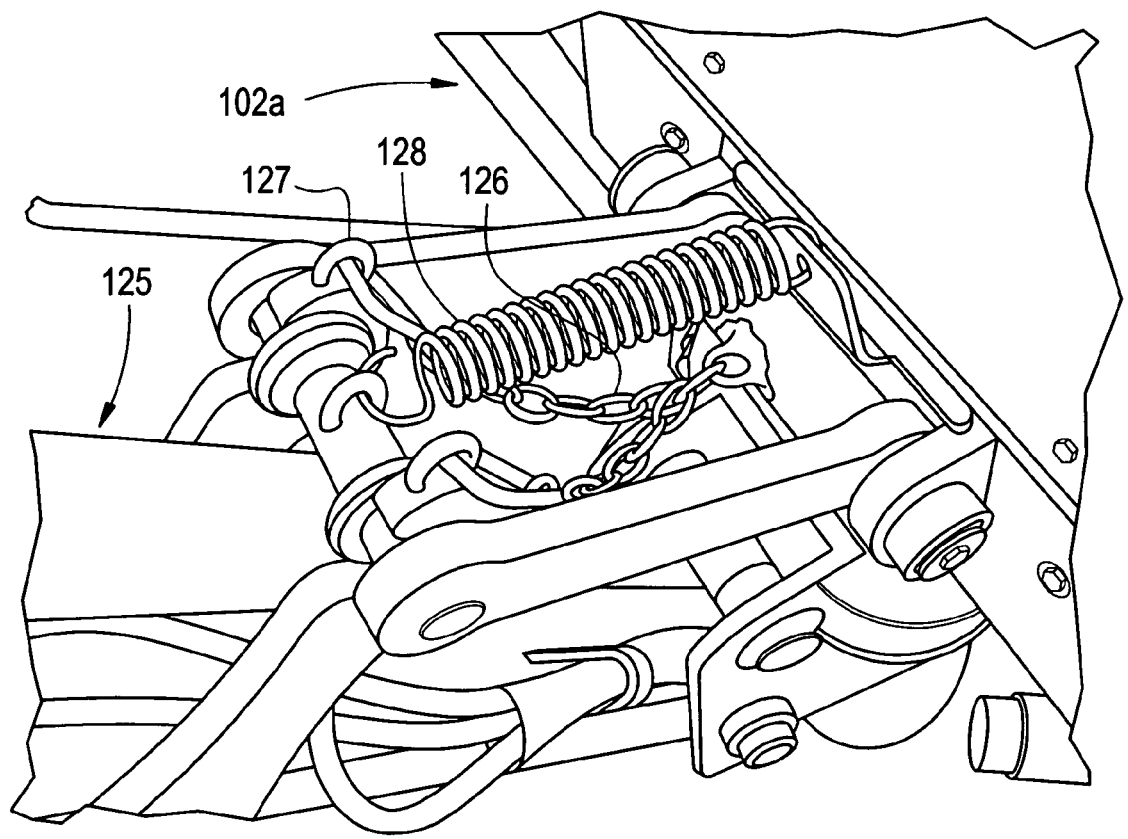
FIG. 5 is a perspective view of a chain and coil assembly of the towing device consistent with the present invention, as attached to the towed vehicle.

Further, in one embodiment consistent with the present invention, additional attachment means 105 include a link or chain assembly 126-128 which has similar safety links or chains 126 attached to brackets 127, which hold the boom 125 to the tractor body, such that the backhoe 102a does not swing or fall on the ground (see FIG. 5). A coiled spring 128 adds further security in this regard.

Figure 6:
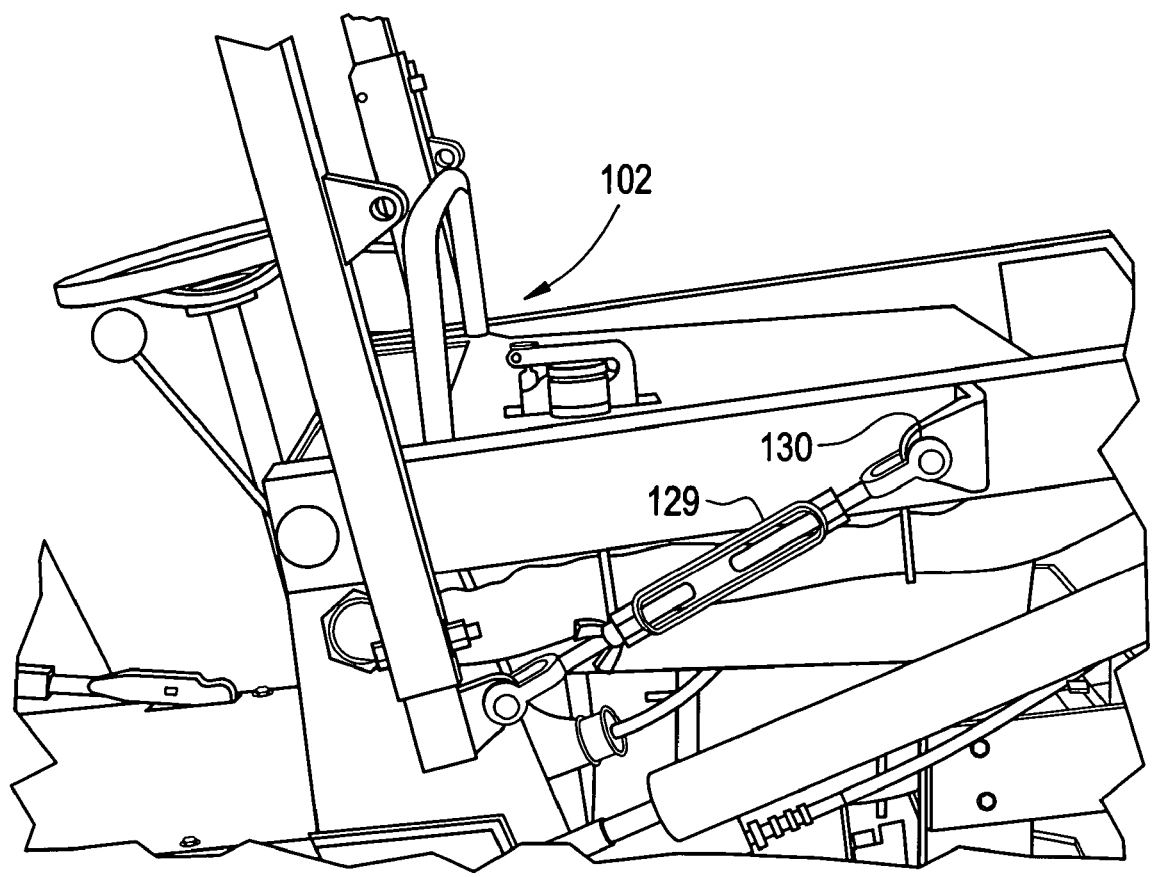
FIG. 6 is a side view of the towed vehicle, showing a turnbuckle assembly of the towing device consistent with the present invention.

For additional security during the towing procedure, in one embodiment consistent with the present invention, turnbuckles 129 are attached to the tractor body off the dash, at the roll bar, using brackets 130 or the like, to connect to the arms 115 of the tractor body, thereby keeping the arms 115 stable and the bucket 113 from falling on the ground (see FIG. 6).

In the exemplary embodiment, once ready to tow, a rear axle lock-in/lock-out mechanism 131 for the tractor 102 (see FIG. 1), can be unlocked to make the rear wheels 132 of the tractor 102 turn freely for mobility. When the vehicle 102 is ready to be unhooked from the towing device 100 and the towing vehicle 101, then the mechanism 131 can be locked to engage the gears for operational use of the vehicle 101.

Although the turnbuckles, brackets and chains are described above as being located in particular positions on the vehicle, one of ordinary skill in the art would recognize that the above brackets, turnbuckles and chains can be attached to the vehicle being towed, in any position that would secure the vehicle and keep it stable during motion, and that the brackets, turnbuckles and chains can be detachable.

Thus, the user can attach brackets or other attachment mechanisms to the vehicle to be towed, and can then attach the turnbuckles and chains at the appropriate positions, in order to secure the vehicle being towed before towing.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A towing device for a vehicle comprising:
   a towbar hitch having opposing ends that include a first end that extends toward a towing vehicle and a second end that extends toward a vehicle to be towed;
   a holder disposed at said second end of said towbar hitch that engages a structure of the vehicle to be towed, the holder having an upper surface that extends above the engaged structure of the vehicle to be towed and a lower surface that extends below the engaged structure of the vehicle to be towed;
   brackets that are provided on the upper surface and the lower surface of the holder; and
   an attachment mechanism that is disposed at the second end of the towbar hitch to engage corresponding brackets that are provided on the upper surface and the lower surface of the holder to secure the vehicle to be towed to said holder.

2. The towing device according to claim 1, wherein said attachment mechanism comprises:
   a plurality of connectors; and
   a plurality of links;
   wherein said connectors and said links engage the corresponding brackets that are provided on the upper surface and the lower surface of the holder.

3. The towing device according to claim 2, wherein said connectors and said links are adjustable in length.

4. The towing device according to claim 3, wherein said connectors are turnbuckles and said links are chains.

5. The towing device according to claim 4, wherein said chains are covered in one of a rubber and a synthetic material.

6. The towing device according to claim 2, further comprising:
   a securing device comprising:
      securing brackets that are attached to the vehicle being towed; and
      connectors that are attached to corresponding securing brackets to immobilize selected portions of the vehicle being towed.

7. The towing device according to claim 6, further comprising pins that are provided to attach the connectors to the corresponding securing brackets.

8. The towing device according to claim 6, wherein said securing device comprises a coiled spring.

9. The towing device according to claim 1, wherein said holder is lined in one of a rubber and a synthetic material.

10. The towing device according to claim 1, further comprising:
    a plurality of supports that are provided at the second end and that are arranged in a widthwise direction of the vehicle to be towed,
    wherein said holder is an elongated U-shaped holder that is coupled to each of the plurality of supports.

11. The towing device according to claim 10, wherein said attachment mechanism comprises:
    a plurality of turnbuckles; and
    a plurality of chains;
    wherein said turnbuckles and said chains engage the corresponding brackets that are provided on the upper surface and the lower surface of the holder.

12. The towing device according to claim 10, wherein said U-shaped holder includes a recess that receives an edge of the engaged structure of the vehicle to be towed.

13. The towing device according to claim 12, wherein a plurality of said chains and a plurality of said turnbuckles secure the U-shaped holder to the engaged structure of the vehicle to be towed.

14. The towing device according to claim 13, wherein said turnbuckles and said chains are adjustable in length.

15. The towing device according to claim 10, further comprising:
    a securing device comprising:
       securing brackets that are attached to the vehicle being towed; and
       connectors that are attached to corresponding securing brackets to immobilize selected portions of the vehicle to be towed.

16. The towing device according to claim 11, wherein said U-shaped holder is lined in one of a rubber and a synthetic material.

17. The towing device according to claim 11, wherein said chains are covered in one of a rubber and a synthetic material.

18. The towing device according to claim 10, further comprising:
    a locking mechanism that locks selected wheels of the vehicle to be towed.

19. The towing device according to claim 15, wherein said securing device further comprises a coiled spring.

20. The towing device according to claim 1, wherein said towbar hitch comprises:
    a plurality of bars at the second end;
    a single bar at the first end.

21. A towing device for a vehicle, comprising:
    a towbar hitch having two ends, a first end that attaches to a towing vehicle and a second end that attaches to a vehicle to be towed;
    a holder disposed at said second end of said towbar hitch, which holds said vehicle to be towed;
    an attachment mechanism that attaches said vehicle to be towed to said holder, the attachment mechanism comprising:
       a plurality of connectors; and a plurality of links;
wherein said connectors and said links are attached to said holder and to said vehicle to be towed,
wherein said connectors and said links are adjustable in length,
wherein said connectors are turnbuckles and said links are chains, and said turnbuckles and said chains are attached to said vehicle being towed using pins at a plurality of brackets, and
wherein said attachment mechanism further comprises a coiled spring.

22. A towing device for a vehicle, comprising:
a towbar hitch having two ends, a first end that attaches to a towing vehicle and a second end that attaches to a vehicle to be towed;
a holder disposed at said second end of said towbar hitch, which holds said vehicle to be towed;
an attachment mechanism that attaches said vehicle to be towed to said holder, the attachment mechanism comprising:
a plurality of connectors; and
a plurality of links;
wherein said connectors and said links are attached to said holder and to said vehicle to be towed,
wherein said connectors and said links are adjustable in length,
wherein said connectors are turnbuckles and said links are chains, and said turnbuckles and said chains are attached to said vehicle being towed using pins at a plurality of brackets, and
wherein said chains are covered in one of a rubber and a synthetic material.

* * * * *